(12) United States Patent
Ko et al.

(10) Patent No.: US 8,199,374 B2
(45) Date of Patent: Jun. 12, 2012

(54) APPARATUS AND METHOD FOR RETAINING A DOCUMENT DURING IMAGING

(75) Inventors: Ken Ko, San Diego, CA (US); Edward A. Hill, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 12/437,798

(22) Filed: May 8, 2009

(65) Prior Publication Data

US 2010/0284044 A1    Nov. 11, 2010

(51) Int. Cl.
*H04N 1/04* (2006.01)
*G03G 15/00* (2006.01)

(52) U.S. Cl. ......... 358/474; 358/497; 399/380; 399/379

(58) Field of Classification Search .................. 358/471, 358/497, 474, 400, 401, 500, 501, 505; 399/380, 399/379
See application file for complete search history.

(56) References Cited

U.S. PATENT DOCUMENTS

| | | | |
|---|---|---|---|
| 6,320,650 B1 | 11/2001 | Fredlund et al. | |
| 6,405,017 B1 * | 6/2002 | Takahashi et al. | 399/380 |
| 6,697,600 B2 * | 2/2004 | Nishikino et al. | 399/380 |
| 6,791,724 B2 | 9/2004 | Khovaylo et al. | |
| 6,957,037 B2 | 10/2005 | Terae et al. | |
| 7,050,206 B2 | 5/2006 | Payne et al. | |
| 2006/0067760 A1 * | 3/2006 | Shimizu et al. | 399/377 |
| 2008/0106771 A1 | 5/2008 | Cao | |
| 2008/0180757 A1 | 7/2008 | Smith et al. | |

* cited by examiner

*Primary Examiner* — Cheukfan Lee

(57) ABSTRACT

Disclosed are apparatuses and methods for holding a document sheet in place against a scanning surface of an image capture system. One such apparatus is a document cover comprising: a body that is oriented parallel to the scanning surface when the document cover is in the closed position; a compliant and elastic document backing that is partially attached to the body and configured to reflect light originating from the image capture system; and a backing constraint configured to secure a central region of the document backing to the body and further configured to constrain movement of the central region in a first direction that is normal to the scanning surface while allowing movement in the same direction of outer regions that are lateral to the central region. The document backing generates a downward spring force which biases the outer regions toward the platen.

19 Claims, 4 Drawing Sheets

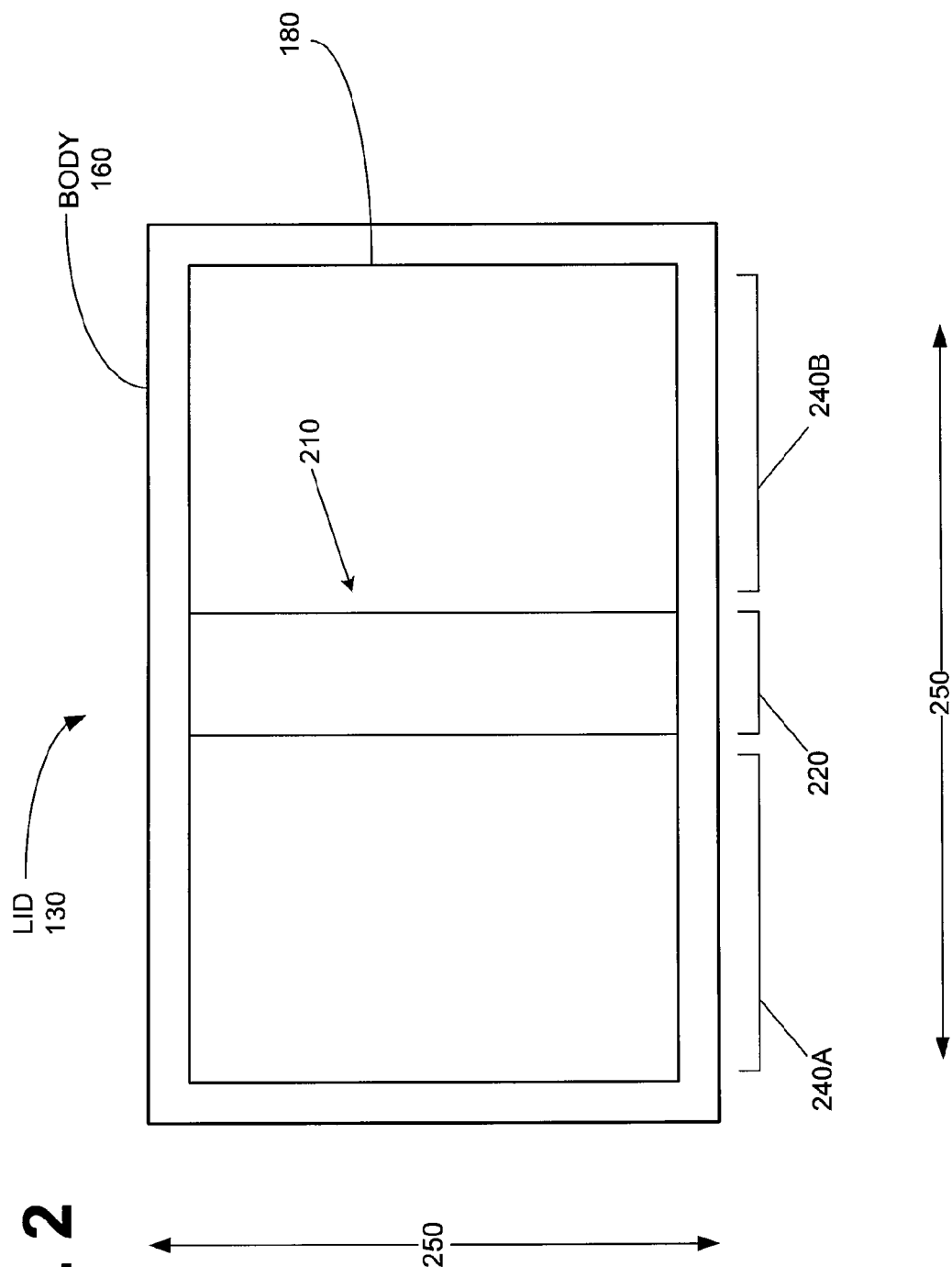

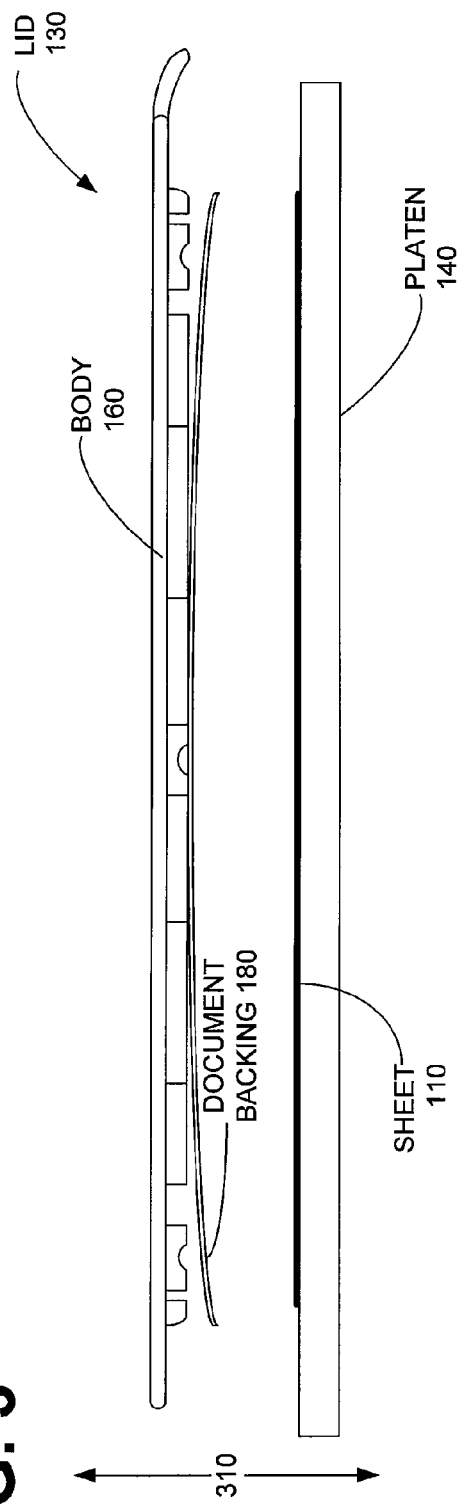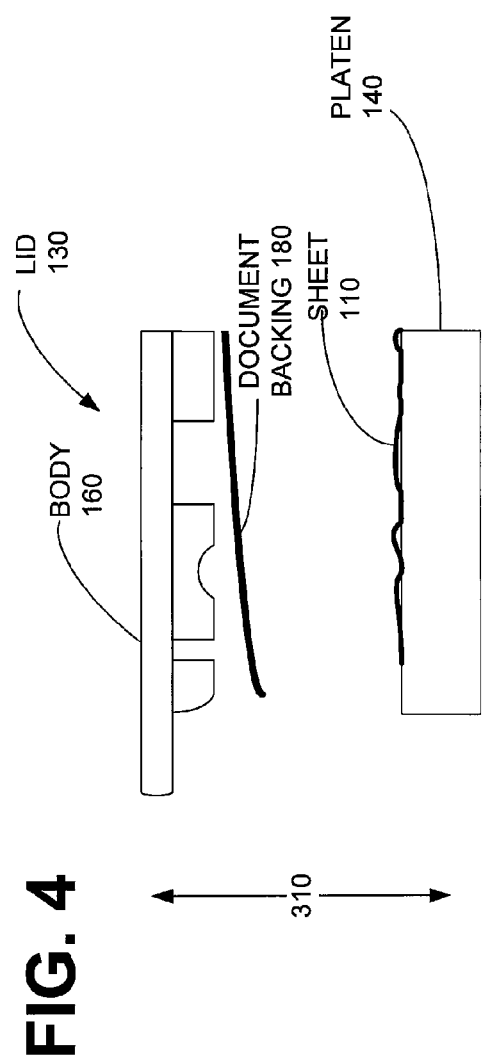

APPARATUS AND METHOD FOR RETAINING A DOCUMENT DURING IMAGING

BACKGROUND

In some document imaging systems, the imaging sensor or capture unit must locate the document on the scanning surface in order to focus properly. If the document cannot be located properly, image quality will degrade. For example, a document that is not flat against the scanning surface because of wrinkles or folds in the document results in blurry text and out-of-focus graphics. Some of these imaging systems use a white background that is placed behind the document to locate the document's vertical position relative to the scanning surface. Even so, conventional imaging systems typically produce images with reduced quality when the document does not rest flat against the scanning surface.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 2 is a bottom view of the lid from FIG. 1 in one embodiment of an image capture system.

FIG. 3 is a sectional side view of one embodiment of an image capture system from FIG. 1, in an open or document receiving position.

FIG. 4 is a close-up of the sectional side view of FIG. 3.

DETAILED DESCRIPTION

The techniques disclosed herein allow a document sheet to be kept in close proximity to a image capture unit during a scanning process. A document backing piece of the unit's lid urges outer regions of the document sheet closer to the flat scanning surface, thus improving the image quality. Various embodiments are now discussed with reference to the figures.

Figure 1:
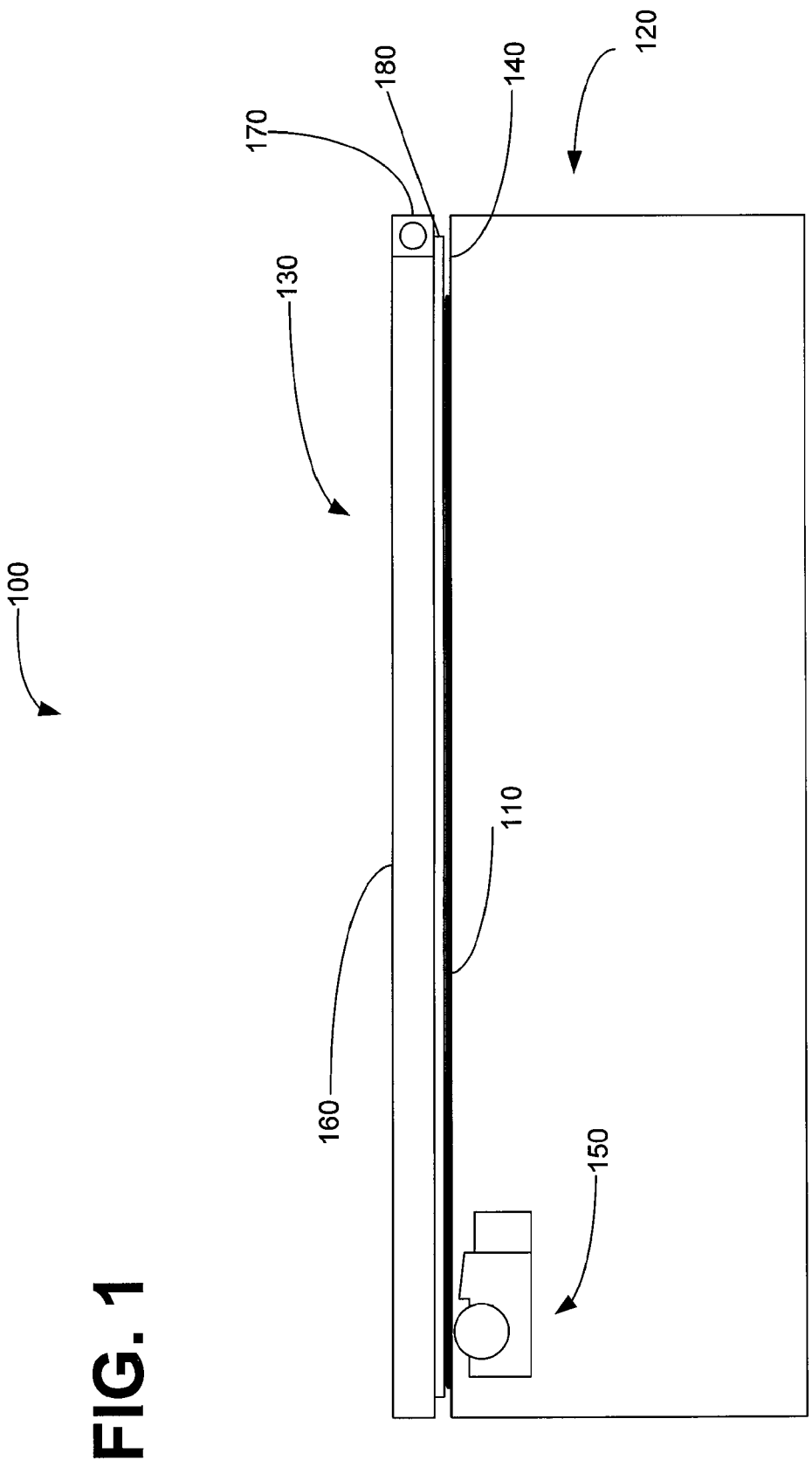
FIG. 1 is a sectional view of one embodiment of an image capture system, in a closed state.

FIG. 1 is a sectional view of image capture system 100 in a closed state. Image capture system 100 is configured to scan or capture an electronic image from a sheet 110, and includes a bed 120 and a lid 130. (Lid 130 is also referred to herein as a document cover.) Bed 120 comprises includes platen 140 and image capture unit 150. Platen 140 is configured to support sheet 110. Platen 140 serves as the scanning surface and acts as a window through which an image of sheet 110 is captured. Platen 140 includes a transparent panel or plate which may be made of glass, plastic, or other suitable materials known to a person of ordinary skill in the art. Image capture unit 150 includes electrical and/or optical components configured to acquire, capture, sense, or scan images from sheet 110, through platen 140. In some embodiments, image capture unit 150 is moved across or along platen 140. In other embodiments, image capture unit 150 remains stationary and is configured to concurrently capture information from substantially an entire surface area of platen 140.

Lid 130 is configured to retain sheet 110 in place against platen 140 during a scan by image capture unit 150. Lid 130 includes body 160, which is pivotally attached to bed 120 by hinge assembly 170, such that lid 130 may be pivoted between an open, or document receiving, state and a closed, or scanning, state. When lid 130 is in the closed state, body 160 is configured to rest upon platen 140 (and is thus oriented parallel to platen 140), thereby inhibiting environmental light from passing through platen 140. Although this example embodiment uses a hinge assembly, other embodiments use mechanisms other than a hinge to movably support lid 130 relative to bed 120.

Lid 130 also includes document backing 180. Document backing 180 includes a substantially planar panel, that is sized and shaped so as to overlay platen 140 when lid 130 is in the closed state (as in FIG. 1). Document backing 180 is configured to reflect light originating from image capture unit 150 back to a sensing device or element associated with image capture unit 150. In this regard, in one embodiment the lower surface of document backing 180 is white, though in other embodiments the lower surface may be colored. In some embodiments, document backing 180 has dimensions corresponding to a standard paper size (e.g., 8.5"×11", 8.5"×14", 210 mm×297 mm, etc.). However, the principles described herein also apply to a document backing 180 with nonstandard dimensions.

FIG. 2 is a bottom view of lid 130. A backing constraint 210 secures or attaches a portion of document backing 180 to body 160 of lid 130, thus supporting document backing 180 relative to body 160. More specifically, backing constraint 210 attaches so as to limit or constrain the extent to which a central region 220 of document backing 180 may move in the direction (310 in FIG. 3) that is normal to the plane of document backing 180 while also allowing outer regions 240A, 240B of document backing 180 to move in direction 310. When lid 130 is in the closed position, direction 310 is also normal to platen 140 so that direction 310 is toward/away from platen 140. In typical usage, direction 310 is generally vertical. Backing constraint 210 also limits the extent to which document backing 180 may move in the plane (240) of document backing 180.

In some embodiments, backing constraint 210 takes the form of adhesive applied between one surface of document backing 180 and an opposing surface of lid 130, generally within central region 220 of document backing 180 and within a corresponding region of the opposing lid surface. In one embodiment, backing constraint 210 is an acrylic layer with adhesive on both sides and that is pressure-sensitive. In some embodiments, the adhesive glues document backing 180 directly to lid 130, with no intermediate layers. In some embodiments, the adhesive is generally continuous throughout central region 220. In other embodiment, the adhesive is not continuous within central region 220, but is instead applied intermittently, for example, in stripes or dots, or in a zigzag fashion.

Lid 130 and document backing 180 work as follows to improve image quality during a scan. FIG. 3 illustrates a sectional side view of image capture system 100 in an open or document receiving position. Sheet 110 is placed on platen 140 while lid 130 is an open position. In this open position, with no structure pressing down upon sheet 110, those portions of sheet 110 which are slightly irregular (e.g., folds and wrinkles) are not in close contact with platen 140. (See the close-up sectional side view of FIG. 4.) This can reduce image quality of a scan, for example, blurring of scanned text or an out-of-focus picture. Document backing 180 is made of a compliant and elastic material, which in combination with backing constraint 210 (and in particular with the location of constraint 210), leaves outer regions 240A, 240B of constraint 210 free to sag toward platen 140 under gravitational forces. This sag is also seen in the close-up sectional side view of FIG. 4. In some embodiments, document backing 180 is a sheet of synthetic paper. As should be understood by a person of ordinary skill in the art, one embodiment of synthetic paper is a thin polypropylene plastic film. In some embodiments, document backing 180 is a thin sheet, with a thickness on the order 0.20-0.30 mm.

Figure 5:
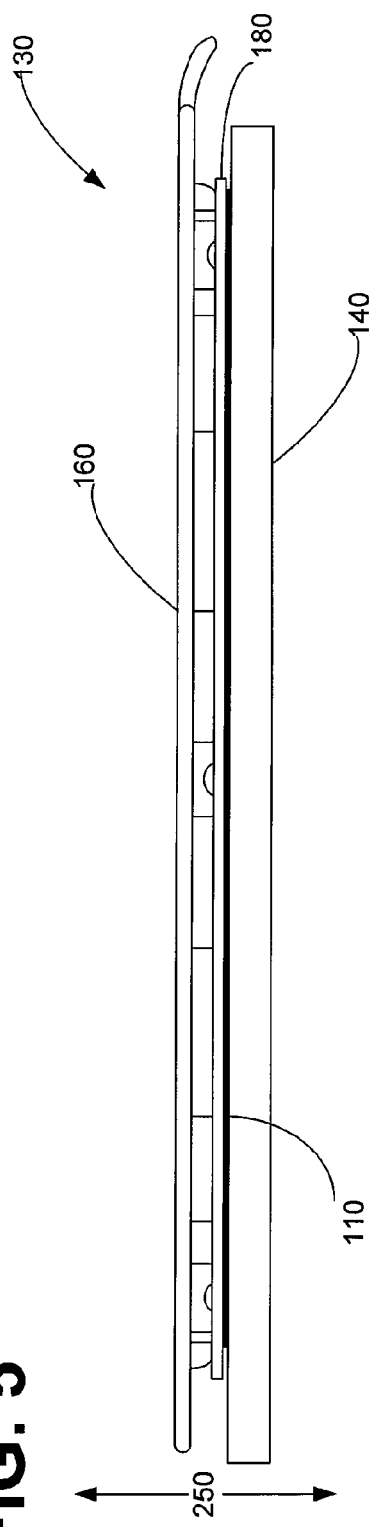
FIG. 5 is a sectional side view of one embodiment of an image capture system from FIG. 1, in an closed or document imaging position.
Figure 6:
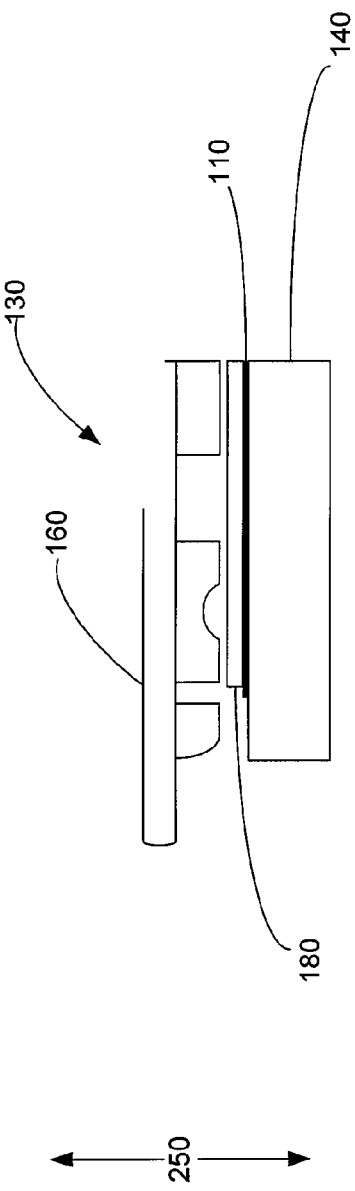
FIG. 6 is a close-up of the sectional side view of FIG. 5.

FIG. 5 illustrates a sectional side view of image capture system 100 in an closed or document imaging position. The downward sag of outer regions 240A, 240B of backing constraint 210, combined with the elastic property of document backing 180, gives document backing 180 a compliant characteristic which generates a downward spring force. This spring force in turn biases or flattens sheet 110, and since outer regions 240A, 240B are unconstrained, these regions are urged toward platen 140. In this manner, irregularities in the regions of sheet 110 that correspond to outer regions 240A, 240B of document backing 180 are urged toward image capture unit 150, resulting in improved image quality. This sag is also seen in the close-up sectional side view of FIG. 6.

In operation, lid 130 is positioned in the open stage shown in FIG. 3, and a sheet 110 is arranged on platen 140. As lid 130 is closed document backing 180 generates a downward spring force against sheet 110. In the fully closed position (see FIG. 5) document backing 180 continues to apply a force which flattens sheet 110 and ensures that sheet 110 is snug against platen 140.

The foregoing description, for purposes of explanation, has been described with reference to specific embodiments. However, the illustrative discussions above are not intended to be exhaustive or to limit the invention to the precise forms disclosed. Many modifications and variations are possible in view of the above teachings. The embodiments were chosen and describe in order to best explain the principles of the invention and its practical applications, to thereby enable others skilled in the art to best utilize the invention and various embodiments with various modifications as are suited to the particular use contemplated.

What is claimed is:

1. A document cover for retaining a document sheet against a scanning surface of an image capture system, the document cover comprising:
    a body that is oriented substantially parallel to the scanning surface when the document cover is in the closed position;
    a compliant and elastic document backing that is partially attached to the body and configured to reflect light originating from the image capture system; and
    a backing constraint configured to secure a central region of the document backing directly to the body without intermediate layers between the body and the document backing, in which the central region extends across a width of the document backing from a first edge of the document backing to a second edge of the document backing and is further configured to constrain movement of the central region in a first direction that is normal to the body in the closed position while allowing movement, in the first direction, of outer regions that are lateral to the central region, the document backing generating a downward spring force which biases the outer regions toward the scanning surface when the document cover is in the closed position.

2. The document cover of claim 1, wherein the document backing comprises a sheet of synthetic paper.

3. The document cover of claim 1, wherein the backing constraint comprises adhesive applied between the central region of one surface of the document backing, and a corresponding central region on an opposing surface of the body.

4. The document cover of claim 3, in which the adhesive comprises intermittent stripes or dots of adhesive material in the central region.

5. The document cover of claim 1, wherein the backing constraint is further configured to limit movement of the document backing in a second direction that is parallel to the scanning surface.

6. The document cover of claim 1, the body being attached to the image capture system by a hinge assembly.

7. The document cover of claim 1, in which the document backing is a polypropylene film having a thickness between 0.20 and 0.30 millimeters.

8. An image capture system for scanning a document sheet, the system comprising:
    a platen configured to support the document sheet;
    an image capture unit configured to scan an image of the document sheet arranged on the platen;
    a document cover configured to retain the document sheet in place against the platen, the document cover comprising:
        a hinge assembly configured to attach the document cover to a bed of the image capture system, and further configured to pivot the cover between an open and a closed position;
        a body that is oriented parallel to the platen when the document cover is in the closed position;
        a compliant and elastic document backing that is partially attached to the body and configured to reflect light originating from the image capture unit back to the image capture unit, in which the document backing is a polypropylene film having a thickness between 0.20 and 0.30 millimeters; and
        a backing constraint configured to secure a central region of the document backing to the body, in which the central region extends across a width of the document backing from a first edge of the document backing to a second edge of the document backing and further configured to constrain movement of the central region in a first direction that is normal to the body in the closed position, the backing constraint further configured to allow movement, in the first direction, of outer regions that are lateral to the central region, the document backing in combination with the backing constraint generating a downward spring force which biases the outer regions toward the platen.

9. The image capture system of claim 8, wherein the backing constraint comprises an adhesive layer applied between the central region of one surface of the document backing, and a corresponding central region on an opposing surface of the body.

10. The image capture system of claim 8, wherein the backing constraint is further configured to limit movement of the document backing in a second direction that is parallel to the scanning surface.

11. The image capture system of claim 8, in which the backing constraint comprises an acrylic layer with pressure sensitive adhesive on both sides of the acrylic layer.

12. The image capture system of claim 8, in which the backing constraint comprises adhesive which adheres the central portion of the document backing directly to the body without any intermediate layers.

13. A method of assembling a document cover for holding a document sheet in place against a scanning surface of an image capture system, the document cover including a body and a document backing, the method comprising:
- providing the body, the body being oriented parallel to the scanning surface when the document cover is in a closed position;
- providing the document backing, the backing being compliant and elastic and having at least one surface configured to reflect light originating from the image capture unit; and
- adhering a central region of the document backing to the body, in which the central region extends across a width of the document backing from a first edge of the document backing to a second edge of the document backing while leaving outer regions that are lateral to the central region free of adhesive, such that movement of the central region is constrained in a direction that is normal to the scanning surface while movement of the outer regions in the same direction is allowed, thereby generating a spring force which biases the outer regions toward the scanning surface when the document cover is in a closed position; and
- hingedly attaching the document cover to the image capture system.

14. The method of claim 13, wherein the document backing comprises a sheet of synthetic paper.

15. The method of claim 13, wherein the adhering comprises applying an adhesive between the central region of one surface of the document backing, and a corresponding central region on an opposing surface of the body.

16. The method of claim 13, wherein adhering is such that movement of the document backing is limited in a second direction that is parallel to the scanning surface.

17. The method of claim 13, in which adhering comprises:
- placing the backing constraint between the document backing and the body, the backing constraint comprising an acrylic layer with pressure sensitive adhesive; and
- pressing the document backing against the body to adhere the document backing to the body.

18. The method of claim 13, in which adhering a central region of the document backing to the body comprises depositing adhesive on the central portion and adhering the document backing directly to the body without any intermediate layers.

19. The method of claim 13, further comprising depositing adhesive on the central region by applying adhesive intermittently within the central region.

* * * * *